United States Patent [19]

Pawelczyk

[11] 4,015,919
[45] Apr. 5, 1977

[54] MULTI-ROLL CALENDER FOR RUBBER OR SYNTHETIC PLASTICS MATERIALS

[75] Inventor: Werner Pawelczyk, Hannover, Germany

[73] Assignee: Hermann Berstorff Maschinenbau GmbH, Hannover-Kleefeld, Germany

[22] Filed: Apr. 30, 1976

[21] Appl. No.: 681,856

[30] Foreign Application Priority Data

May 24, 1975 Germany .......................... 2523088

[52] U.S. Cl. .............................. 425/367; 425/363; 425/DIG. 235; 100/168
[51] Int. Cl.² ........................................ B29C 15/00
[58] Field of Search .......... 425/367, 237, 335, 224, 425/DIG. 235, 363; 100/168

[56] References Cited

UNITED STATES PATENTS

| | | | |
|---|---|---|---|
| 571,226 | 11/1896 | Hadfield | 425/DIG. 235 |
| 2,308,040 | 1/1943 | Anderson | 425/DIG. 235 |
| 2,629,272 | 2/1953 | Wood | 425/DIG. 235 |
| 2,678,464 | 5/1954 | Spencer | 425/367 |
| 2,861,504 | 11/1958 | Kane | 425/DIG. 235 |
| 3,492,845 | 2/1970 | Nomura | 425/DIG. 235 |

*Primary Examiner*—Robert L. Spicer, Jr.
*Attorney, Agent, or Firm*—Donald D. Jeffery

[57] ABSTRACT

A multi-roll calender for rubber or synthetic plastics material comprising a pair of rolls mounted at their ends in a calender stand, in which at each of the ends of the pair of rolls, the pair of rolls are rotatably mounted in a bearing block which can be moved to move the pair of rolls together with respect to the calender stand with the gap between the two rolls of the pair rolls maintained constant, one of the rolls of the pair rolls is displaceable relative to the bearing block and to the other roll by having its end engaged in a mounting member which is displaceable in the bearing block, a fixed screw spindle is secured to the mounting member, a rotatable internally threaded sleeve is secured against axial movement in the calender stand and has the fixed screw spindle engagement therein, a drivable worm wheel is rotationally rigidly connected to the internally threaded sleeve, the internally threaded sleeve carries an electromagnetic coupling which can be energised to entrain a spur gear for rotation with the internally threaded sleeve, the spur gear is meshed with two further spur gears each rotationally rigidly connected to a respective further rotatable internally threaded sleeve secured against axial movement in the calender stand and respective screw spindles are secured to the bearing block and are each engaged in a respective one of the further rotatable internally threaded sleeves.

3 Claims, 5 Drawing Figures

MULTI-ROLL CALENDER FOR RUBBER OR SYNTHETIC PLASTICS MATERIALS

The invention relates to a multi-roll calender for rubber or synthetic plastics material.

It has been previously proposed in multi-roll calenders to have a pair of rolls disposed for joint movement, that is to say with the roll gap between the two rolls of the pair of rolls constantly retained, and to have one of the two rolls of the pair displaceable in relation to the other of the two rolls of the pair.

Thus the journals of two adjacently disposed calender rolls located in one plane can be mounted in bearing blocks. At each of the ends of the rolls a bearing block is displaceably guided in the calender stand. Mounted in the bearing block are the roll journals of one end of the two rolls, one roll being rigidly and the other roll displaceably mounted in the bearing block. Adjustment of the bearing block is effected by a setting device disposed on the calender stand and drivable by a positioning motor. The roll which is mounted rigidly in the bearing block is disposed in the bearing block at a position remote from the positioning device. The adjustable roll supported in a mounting member displaceable in the bearing block lies alongside the fixed roll at a position adjacent the setting device. The mounting member is displaceable via a motor-driven setting device which is disposed at the end face of the bearing block.

In order to be able to move both rolls jointly, for example in order to adjust a roll gap between one of the rolls of the pair and a fixed roll located in the same roll plane, the setting device which acts on the bearing block is operated. The roll gap between the two rolls mounted in the bearing block can be adjusted by means of the setting device which acts upon the mounting member of the adjustable mounted roller.

This previously proposed arrangement has the disadvantage that the two setting devices required have to be disposed one after the other in the positioning direction. In consequence, in the event of the bearing blocks being vertically disposed, the overall height of the structure has to be considerable or, in the event of a horizontal arrangement, the calender has to be of considerable width.

The invention is based on the problem of reducing the overall height or width of a multi-roll calender described at the outset.

According to the invention, there is provided a multi-roll calender for rubber or synthetic plastics material comprising a pair of rolls mounted at their ends in a calender stand, in which at each of the ends of the pair of rolls, the pair of rolls are rotatably mounted in a bearing block which can be moved to move the pair of rolls together with respect to the calender stand with the gap between the two rolls of the pair rolls maintained constant, one of the rolls of the pair of rolls is displaceable relative to the bearing block and to the other roll by having its end engaged in a mounting member which is displaceable in the bearing block, a fixed screw spindle is secured to the mounting member, a rotatable internally threaded sleeve is secured against axial movement in the calender stand and has the fixed screw spindle engaged therein, a drivable worm wheel is rotationally rigid connected to the internally threaded sleeve, the internally threaded sleeve carries an electromagnetic coupling which can be energised to entrain a spur gear for rotation with the internally threaded sleeve, the spur gear is meshed with two further spur gears each rationally rigidly connected to a respective further rotatable internally threaded sleeve secured against axial movement in the calender stand and respective screw spindles are secured to the bearing block and are each engaged in a respective one of the further rotatable internally threaded sleeves.

A multi-roll calender according to the invention has the advantage that only one positioning motor is required to drive the worm wheel by means of a worm. By actuating the positioning motor, with the electromagnetic coupling in the disengaged condition, only said one roll is moved in order to vary the roll gap between the pair of rolls. When the coupling is in the engaged condition, operation of the positioning motor will move the pair of rolls jointly with respect to the calender stand and thus with respect to a further roll while maintaining the roll gap between said pair of rolls.

The invention permits of a lower overall height or width of the calender since the setting device of the individually adjustable roll which was hitherto disposed on the bearing block can be likewise disposed on the calender stand in conjunction with the setting device for the bearing block.

This reduction in the overall dimensions is of decided importance in the light of the increasing number of large and extremely large calender installations, particularly since calenders having seven rolls are now being manufactured.

The invention is diagrammatically illustrated by way of example in the accompanying drawings. For the sake of greater clarity, known ancillary apparatus which is not relevant to an understanding of the invention has been omitted. In each case, only one end of the calender is shown and described, the other end being of indentical construction.

Figure 1:
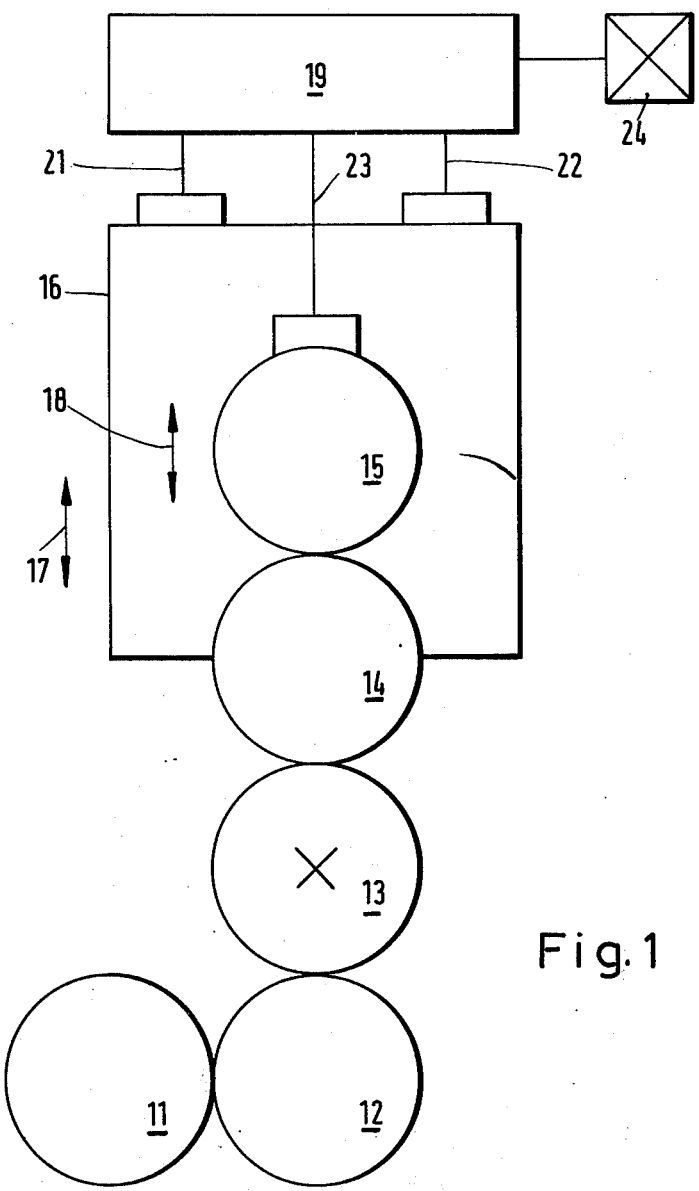
FIG. 1 shows a schematic view of a five-roll L calender according to the invention with a two-roll bearing block.

Referring to FIG. 1, a five-roll L calender has rolls 11 to 15, of which the roll 13 is a fixed roll, i.e. rotatable but not otherwise movable. The pairs of rolls 14, 15 located above the fixed roll 13 is mounted in a bearing block 16. The bearing block 16 is displaceable, as indicated by arrow 17, in a calender stand (not shown). The roll 14 is not displaceable in the bearing block 16 but the roll 15 is mounted for movement in the bearing block 16, as indicated by arrow 18, via a mounting (not shown). A setting unit 19 supported on the calender stand has two screw spindles 21 and 22 which act on the bearing block 16. The roll 15 which is displaceably mounted in the bearing block 16 is adjustable by means of a screw spindle 23 of the setting unit 19. Reference numeral 24 denotes a positioning motor of the setting unit 19. The setting unit 19 and its mode of functioning are explained in greater detail hereinafter with reference to FIG. 5.

In order to adjust the roll gap between the rolls 13 and 14, the bearing block 16 and thus the pair of rolls 14, 15 are displaced together as indicated by arrow 17. If the roll gap of the pair of rolls 14, 15 is to be altered, the roll 15 is displaced with respect to the bearing block 16 as indicated by arrow 18.

Figure 2:
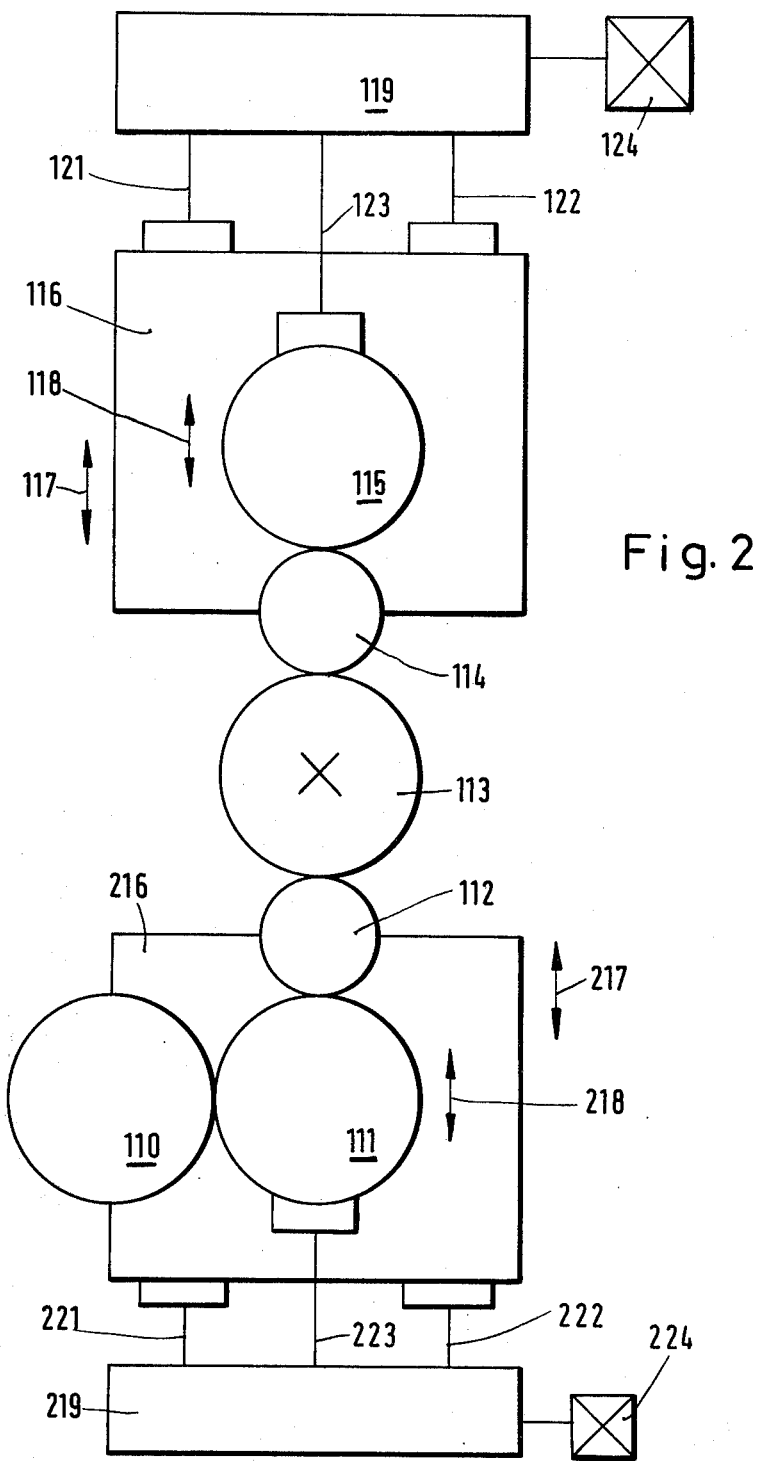
FIG. 2 shows a schematic view of a six-roll L calender according to the invention operating on the working and supporting roll principle with two adjusting units for two pairs of rolls.

The six-roll L calender according to FIG. 2 has rolls 110 to 115. The rolls 112 and 114 are working rolls and are of smaller diameter than the rolls 110, 111, 113, and 115 which are supporting rolls. The position of the supporting roll 113, is fixed. The pair of rolls 114, 115 comprising the working roll 114 and the supporting roll 115, are mounted in a bearing block 116 above the fixed roll 113. The bearing block 116 is displaceable in a calender stand (not shown) as indicated by arrow 117. The working roll 114 is not displaceable in the bearing block 116 but the supporting roll 115 is adapted for displacement as indicated by arrow 118, by mounting it in a mounting member (not shown) displaceable in the bearing block 116. A setting unit 119 supported on the calender stand has two screw spindles 121 and 122 acting on the bearing block 116. The supporting roll 115 mounted for displacement within the bearing block 116 is adjusted via a screw spindle 123 of the setting unit 119. Reference numeral 124 denotes a positioning motor for the setting unit 119.

The pair of rolls 111, 112 comprising the working roll 112 and the supporting roll 111 are mounted in a bearing block 216 below the fixed roll 113. The bearing block 216 is displaceable, as indicated by arrow 217, in a calender stand, (not shown). The working roll 112 is not displaceable in the bearing block 216, but the supporting roll 111 is mounted for displacement, as indicated by arrow 218, by means of a mounting member (not shown). A setting unit 219 supported on the calender stand has two screw spindles 221 and 222 which act on the bearing block 216. The supporting roll 112 mounted for displacement in the bearing block 216 is adjusted via a screw spindle 223 of the setting unit 219. Reference numeral 224 denotes a positioning motor for the setting unit 219.

Figure 5:
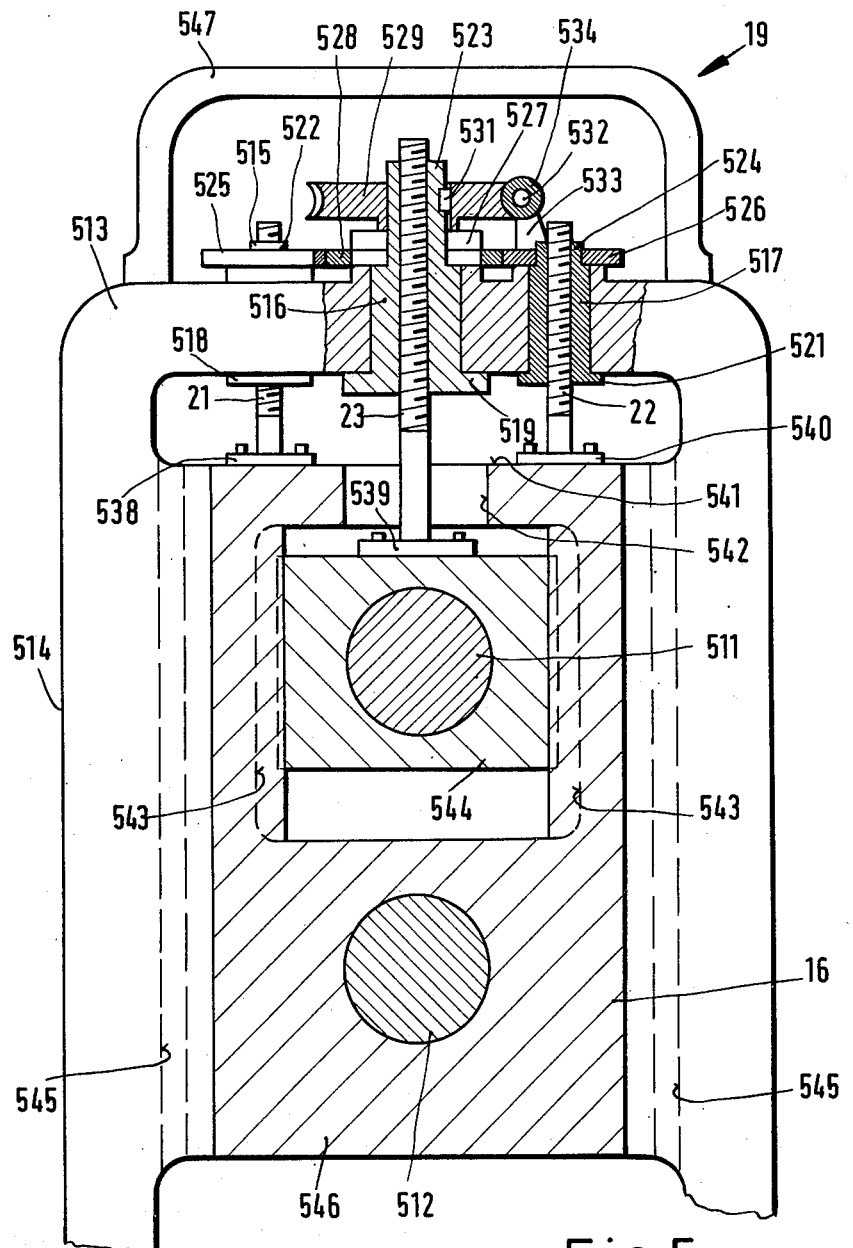
FIG. 5 shows a partly sectioned view through the bearing block of the calender of FIG. 1.

In their construction and mode of operation, the setting units 119, and 219 are the same as the setting unit 19 which is described with respect to FIG. 5.

In order to adjust the roll gap between the rolls 113 and 114, the bearing block 116 and thus the pair of rolls 114, 115 are jointly displaced. If it is desired to alter the roll gap between the pair of rolls 114, 115 the supporting roll 115 is displaced with respect to the bearing block 116.

The bottom pair of rolls 111, 112 are adjusted in like manner.

Figure 3:
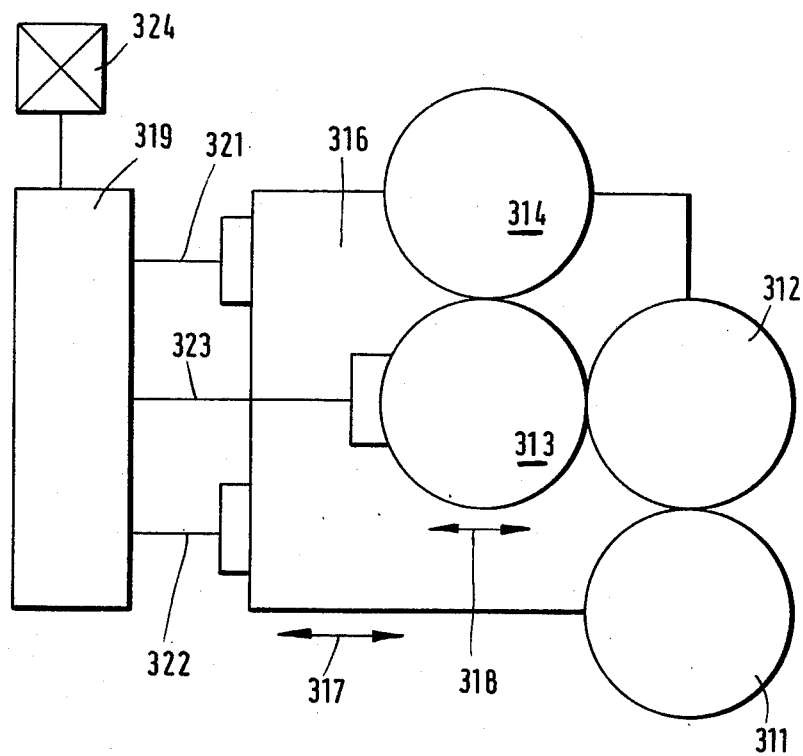
FIG. 3 shows a schematic view of a Z calender according to the invention

The four-roll Z calender shown in FIG. 3 has rolls 311 to 314. The pair of rolls 312, 313, the axes of the rolls of which lie in the same horizontal plane, is mounted in a horizontally displaceable bearing block 316. The bearing block 316 is displaceable, as indicated by arrow 317, in a calender stand (not shown). The roll 312 is rigidly mounted in the bearing block 316 while the roll 313 is displaceable, as indicated by arrow 318, in the bearing block 316 via a mounting member (not shown). A setting unit 319 supported on the calender stand has two screw spindles 321 and 322 acting on the mounting block 316. The roll 313 which is mounted for displacement in the bearing block 316 is adjusted via a screw spindle 323 of the setting unit 319. Reference numeral 324 denotes a positioning motor of the setting unit 319.

In its construction and mode of functioning, the setting unit 319 is identical to the setting unit 19 described with respect to FIG. 5.

Figure 4:
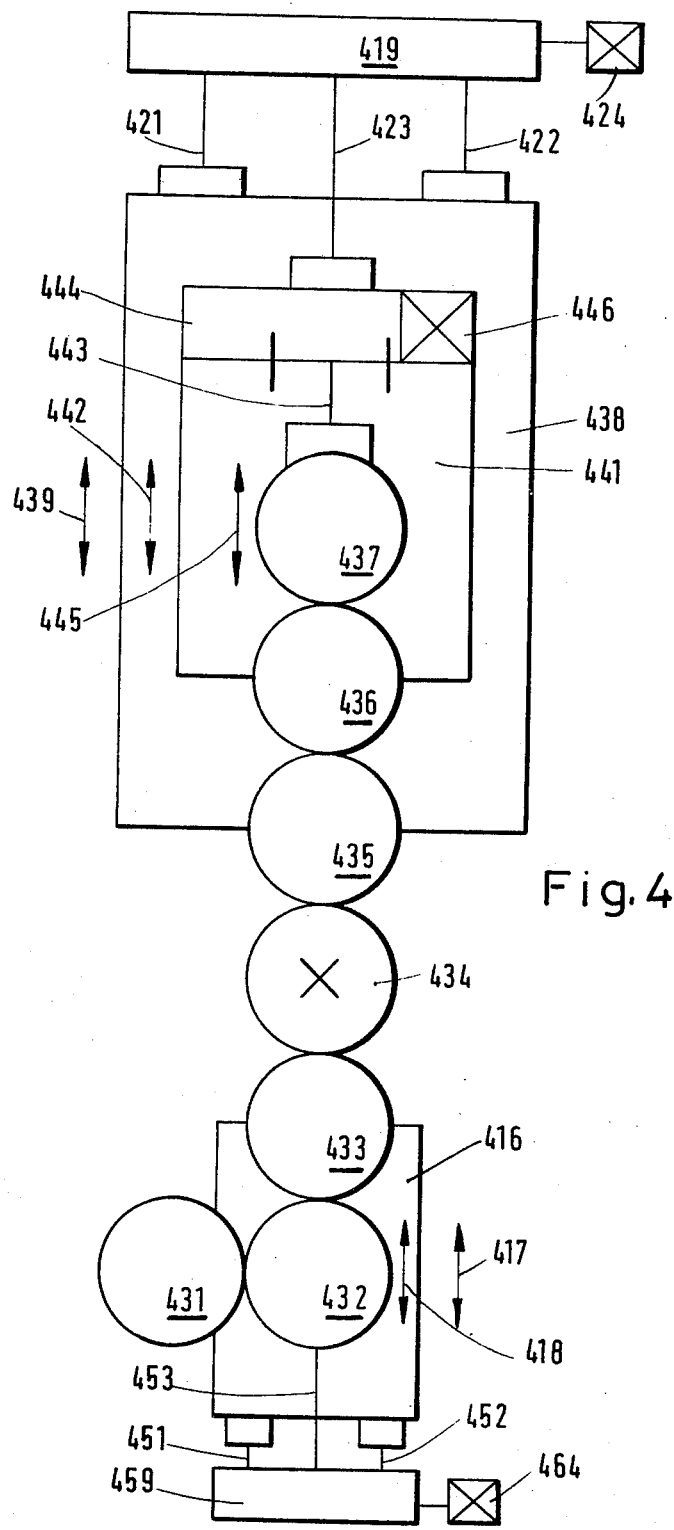
FIG. 4 shows a schematic view of a seven-roll L calender according to the invention.

The seven-roll L calender shown in FIG. 4 has rolls 431 to 437, the roll 434 being a fixed roll. The three rolls 435 to 437 disposed above the fixed roll 434 are directly or indirectly mounted in an outer bearing block 438. The outer bearing block 438 is displaceable in a calender stand (not shown) as indicated by arrow 439. The roll 435 is rigidly mounted in the outer bearing block 438. Displaceably guided in the outer bearing block 438 is an inner bearing block 441 in which the roll 436 is rigidly mounted and the roll 437 is mounted for displacement via a mounting member (not shown). A setting unit 419 supported on a calender stand has two screw spindles 421 and 422 acting on the outer bearing block 438. The inner bearing block 441 which is displaceable in the outer bearing block 438 is adjustable via a screw spindle 423 of the setting unit 419 as indicated by arrow 442. Reference numeral 424 denotes a positioning motor of the setting unit 419.

The roll 437 is adjustable within the inner bearing block 441 by means of a screw spindle 443 engaging the mounting member of the displaceable roll 437 and forming part of a separate setting device 444 which is supported on the inner bearing block 441, the direction of adjustment being indicated by the arrow 445. The setting device 444 can be actuated by means of a positioning motor 446.

The pair of rolls 432, 433 disposed below the fixed roll 434 is mounted in a bearing block 416. The bearing block 416 is guided for displacement, as indicated by arrow 417, in a calender stand, (not shown). The roll 433 is rigidly mounted in the bearing block 416 while the roll 432 is displaceable, as indicated by arrow 418, via a mounting member, (not shown). The initiation of force for adjusting the bearing block 416 is brought about via screw spindles 451 and 452 of a setting unit 459 supported on the calender stand. The roll 432 is displaced via the screw spindle 453 of the setting unit 459. The setting unit 459 can be driven by a positioning motor 464.

In their construction and mode of functioning, the setting units 419 and 459 are identical to the setting unit 19 which is described in greater detail with reference to FIG. 5.

For adjusting the roll gap between the fixed roll 434 and the roll 435, the outer bearing block 438 is displaced via the setting unit 419. The position of the rolls 435 to 437 with respect to one another remain unchanged. The roll gap between the rolls 435 and 436 can be varied by moving the inner bearing block 441. The roll gap between the rolls 436 and 437 is adjustable by moving the roll 437 in the inner bearing block 441 by means of the setting device 444.

The roll gap between the fixed roll 434 and the roll 433 is adjusted by displacement of the bearing block 416. The roll gap between the rolls 432 and 433 can be varied by displacement of the roll 432 in the bearing block 416.

The setting unit 29 of FIG. 1 for the pair of rolls 14, 15 is shown in partial section in FIG. 5. Only mounted roll journals 511 and 512 of the rolls 14, 15 respectively are shown. The setting unit 19 has internally threaded sleeves 515 to 517 which are rotatable in bores in a cross-member 513 of a calender stand 514.

The internally threaded sleeve 514 to 517 have respective lower end flanges 518, 519, 521 resting against the underside of the cross-member 513 and have portions thereof 522, 523, 524 projecting upwardly from the cross-member 513 of reduced diameter. The outer internally threaded sleeves 515 and 517 carry on their projecting portions 522, 524 a respective spur gear 525, 526 secured against rotation with respect to the threaded sleeves 515, 517. The middle sleeve 516 carries on its projecting portion 523 a per se known electromagnetic toothed coupling 527, (not described in detail here) which has one coupling member rotationally rigidly disposed on the projecting portion 523 and the other coupling member carrying a spur gear 528 and free to rotate on the projecting portion 523 when an electromagnetic of the coupling 527 coil is not energised. The spur gear 528 of the electromagnetic toothed coupling 527 meshes constantly with the spur gears 525 and 526 of the outer sleeves 515 and 517.

Above the electromagnetic toothed coupling 527, a worm wheel 529 is, by means of an adjusting spring connection 531, rotationally rigidly disposed on the projecting portion 523 of the middle internally threaded sleeve 516. The worm gear 529 meshes with a worm 534 secured on a shaft 532 mounted in a bearing block 533 mounted on the cross-member 513. The worm 534 is capable of being driven by a positioning motor (not shown).

The three internally threaded sleeves 515 and 517 have respective threaded spindles 21 to 23 engaged therein at the bottom end of which spindles a respective flange 538 to 540 is provided. The flanges 538 and 540 of the outer screw spindles 21 and 23 are screwed onto the upper end face 541 of the bearing block 16. The flange 539 of the middle screw spindle 23 which spindle 23 passes through a bore 542 in the upper end face 541 of the bearing block 16, is screwed onto a mounting member 544 which is movably guided in inner guide grooves 543 in the bearing block 16. The roll journal 511 of the roll 15 is mounted in the mounting member 544. The bearing block 16 is guided for displacement in guide grooves 545 of the calender stand 514 and has the journal 512 of the roll 14 mounted in a lower part thereof.

The setting unit 19 is covered by a protective cover 547 mounted on the cross-member 513 of the calender stand 514.

The further construction of the calender according to FIG. 1 is known per se and need not be either described or illustrated in greater detail here.

If it is desired to alter the roll gap between the rolls 14 and 15 mounted in the bearing block 16, the coil of the elctromagnetic toothed coupling 527 is de-energised and the positioning motor 24 is operated. The worm gearing 534, 529 rotates the axially positionally secured middle internally threaded sleeve 516. According to the direction of rotation, so the screw spindle 23 is positvely displaced in an axial direction, raising or lowering thereby the mounting member 544 in which the roll journal 511 of the roll 15 is mounted. Since such a mounting member 544 is disposed in the bearing block at each end of the roll 15, the roll gap between the rolls 14 and 15 is altered in parallel.

If the roll gap between the roll 14 and the fixed roll 13 shown in FIG. 1 is to be altered, the coil of the electromagnetic toothed coupling 527 is energised and the positioning motor 24 operated. Rotation of the middle internally threaded sleeve 516 by the worm gearing 534, 529 thus causes rotation also of the spur gear 528. The spur gear 525 and 526 of the outer internally threaded sleeves 515 and 517, which constantly mesh with the spur gear 528, are positively co-rotated and turn their internally threaded sleeves 515, and 517. The screw spindles 21, 22 and 23 are uniformly displaced in an axial direction and raise or lower the mounting member 544 and the bearing block 16, according to the direction of rotation of the worm gearing together thereby maintaining the roll gap between the rolls 14 and 15.

I claim:

1. In a multi-roll calender for rubber or synthetic plastics material a pair of rolls with a gap therebetween and mounted at their ends in a calender stand, in which at each of the ends of said pair of rolls, said pair of rolls are rotatably mounted in a bearing block which can be moved to move said pair of rolls together with respect to said calender stand with said gap between said two rolls of the pair rolls maintained constant, one of the rolls of said pair of rolls is displaceable relative to said bearing block and to the other roll of said pair of roll by having its end engaged in a mounting member which displaceable in said bearing block, a fixed screw spindle is secured to said mounting member, a rotatable internally threaded sleeve is secured against axial movement in said calender stand and has said fixed screw spindle engaged therein, a drivable worm wheel is rotationally rigidly connected to said internally threaded sleeve, said internally threaded sleeve carries an electromagnetic coupling which can be energised to entrain a spur gear for rotation with said internally threaded sleeve, said spur gear is meshed with two further spur gears each rotationally rigidly connected to a respective further rotatable internally threaded sleeve secured against axial movement in said calender stand and respective screw spindles are secured to said bearing block and are each engaged in a respective one of said further rotatable internally threaded sleeves.

2. A multi-roll calender as claimed in claim 1, wherein one of the rolls of said pair of rolls co-operates with a fixed roll.

3. A multi-roll calender as claimed in claim 2, wherein a further pair of rolls provided with means whereby they can be moved together with respect to said calender stand and means whereby one of the rolls of said further pair of rolls can be moved with respect to the other of the rolls of said further pair of rolls, also co-operate with said fixed roll.

* * * * *